(12) United States Patent
Varma et al.

(10) Patent No.: US 6,507,831 B1
(45) Date of Patent: Jan. 14, 2003

(54) AUTOMATED CREATION OF A DIAGNOSTIC TOOL FOR THE SERVICING OF EQUIPMENT FROM FREE FORM TEXT DISPATCHES

(75) Inventors: Anil Varma, Clifton Park, NY (US); Rasiklal Punjalal Shah, Latham, NY (US); Vipin Kewal Ramani, Niskayuna, NY (US); Randal V. Dusing, Mukwonago, WI (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/441,326

(22) Filed: Nov. 16, 1999

(51) Int. Cl.$^7$ .................................................. G06N 5/02
(52) U.S. Cl. ......................................................... 706/48
(58) Field of Search ........................ 706/12, 48, 11; 707/500

(56) References Cited

U.S. PATENT DOCUMENTS

| | | | | |
|---|---|---|---|---|
| 5,701,400 A | * | 12/1997 | Amado | 706/45 |
| 6,138,087 A | * | 10/2000 | Budzinski | 704/9 |
| 6,233,545 B1 | * | 5/2001 | Datig | 704/2 |

* cited by examiner

*Primary Examiner*—Thomas Black
*Assistant Examiner*—Joseph P Hirl
(74) *Attorney, Agent, or Firm*—David C. Goldman; Noreen C. Johnson

(57) ABSTRACT

The present invention is directed to a method for processing records to extract relevant, reusable diagnostic information and make the information available in a form capable of being used by field engineers to speed the diagnosis and repair or adjustment of equipment.

16 Claims, 2 Drawing Sheets

AUTOMATED CREATION OF A DIAGNOSTIC TOOL FOR THE SERVICING OF EQUIPMENT FROM FREE FORM TEXT DISPATCHES

BACKGROUND OF THE INVENTION

The present invention relates to the diagnosis of problems with equipment, especially complex equipment.

Presently, many companies market products that, when there is a problem, are serviced by field engineers. Typically, the field engineer diagnoses the problem with the product and then performs any necessary repairs or adjustments to the product. With respect to each problem with a product, the field engineer drafts a repair record that includes a description of the problem or symptoms of the problem and when appropriate, a description of the repair or adjustment made to address the problem. In many cases, the descriptions in the repair record are in either free-form text that characteristically has spelling errors, abbreviations, technical terms and terms of art or in multimedia form where text is an integral part of the record. This information is typically stored in a dispatch database that is used to describe the service performed to the customer and to keep a history of the problems with a particular product at a client's site.

BRIEF SUMMARY OF THE INVENTION

Thus, there is a particular need that the records contain substantial data that could be used to speed the diagnosis and repair of a product but that the variation in the text prevents the relevant data from being extracted and placed in a form that is available to a field engineer. The present invention addresses this problem by providing a method for processing records to extract diagnostic information from records and make the information available to field engineers and others.

In one embodiment, the method involves accessing two groups of records that typically includes a problem and a solution to the problem. The first groups of records has been determined by an expert to be diagnostically relevant, i.e., a field engineer encountering the same or a similar problem would find the information in the record to be useful. For instance, the information may include a problem with a unique set of symptoms that required a substantial amount of time for the field engineer that generated the record to diagnose. Another engineer encountering the same or a similar problem would be able to much more quickly or efficiently address the problem if the information from the record was available. The second group of records has been determined by an expert to be diagnostically irrelevant, i.e., of little use to another field engineer. For instance, a record indicating that normal preventive maintenance had been performed would likely be considered to be diagnostically irrelevant.

The first and second groups of records are analyzed to learn the reasoning used by the expert to sort the records into the first and second groups. In one embodiment, the analysis involves breaking the record phrases into fragments, which are referred to as n-grams, with "n" representing the length of the fragment. For example, the word "diagnose" has the following 3-grams: "dia", "iag", "agn", "gno", "nos" and "ose". Associated with each n-gram are two counts, the first count is the number of times that the n-gram has occurred in the first group and the second count is the number of times that the n-gram has occurred in the second group. These counts are used to assign a weight to each n-gram that can be subsequently used to automatically determine whether a record is diagnostically relevant or irrelevant. For example, words like "repair" and "replace" should occur more frequently in the first group, i.e., the diagnostically relevant group. Consequently, the n-grams associated with these words tend to be positively weighted, indicating their diagnostic relevance. In contrast, words like "void" and "duplicate" should occur more frequently in the second group, i.e., the diagnostically irrelevant group. The n-grams associated with these words tend to be negatively weighted. Finally, words like "the", "for", "is" and "a" typically occur approximately equally in the first and second groups, reflecting their low value in determining whether a record is relevant or irrelevant. Consequently, the n-grams associated with these words tend to have weights of approximately zero.

The weights associated with each n-gram are retained in a database or other appropriate data structure and used to automatically assess whether a candidate record provides diagnostically relevant information that should be included in a database available to field engineers. In one embodiment, the candidate record is broken into n-grams. The weights for each of the n-grams in the candidate record that are also in the database are retrieved and summed. If the sum is positive, this indicates that the candidate record tends to be diagnostically relevant. A negative sum is indicative of the candidate record being diagnostically irrelevant. The absolute magnitude of the sum represents the degree to which the candidate record is diagnostically relevant or irrelevant. For instance, a very high positive sum would indicate that the candidate record is very, diagnostically relevant and the information contained in the candidate record should be added to the database for use by the field engineers.

DETAILED DESCRIPTION OF THE INVENTION

The present invention is directed to a method for learning the reasoning used by an expert to determine whether a record, which typically includes spelling errors, abbreviations, terms of art, technical terms and the like, should be included in a database of diagnostically relevant records that are accessible to a field engineer. The learned reasoning is subsequently used to automatically determine whether other records should be added to the database.

Figure 1:
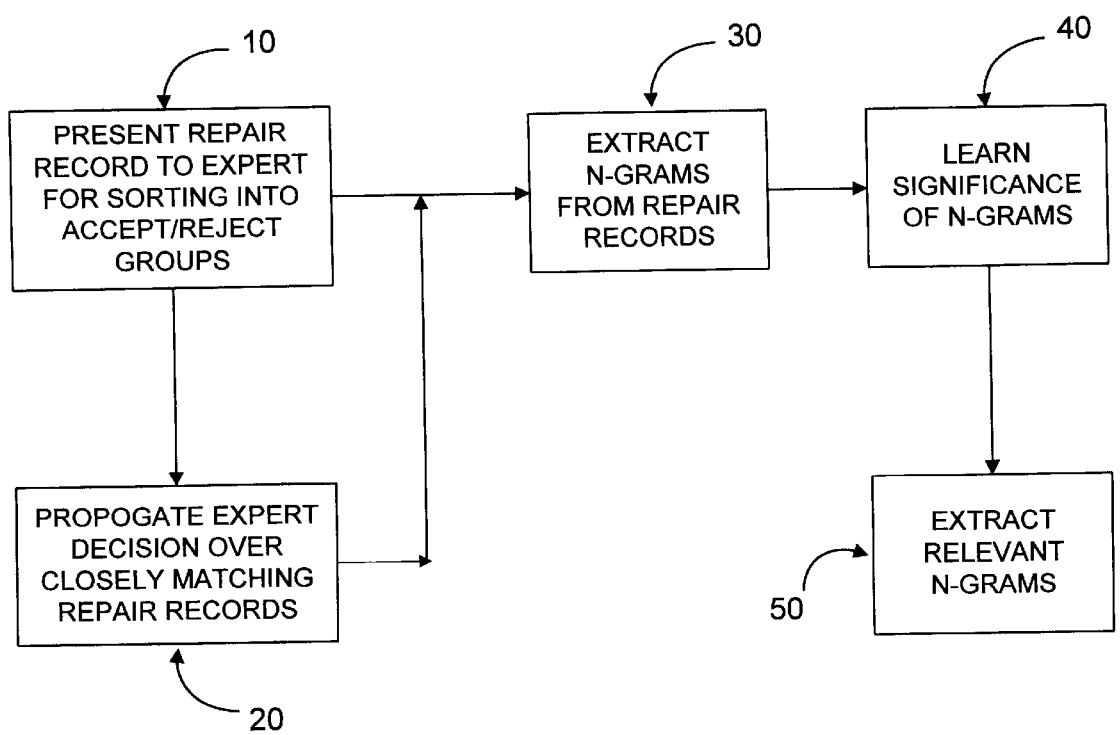
FIG. 1 is a block diagram of a method for learning the basis upon which an expert has determined a plurality of records are diagnostically relevant or diagnostically irrelevant.

With reference to FIG. 1, a method is illustrated for learning the basis upon which an expert has determined that a plurality of repair records are diagnostically relevant or irrelevant. Although this embodiment is described with reference to repair records, other records such as maintenance records, event logs and operational records may be used in conjunction with the following method. The method includes the step 10 of presenting a repair record to an expert for determining whether the record is diagnostically relevant or irrelevant. The expert either sorts the repair record into a first group of diagnostically relevant repair records or a second group of diagnostically irrelevant repair records. Typically, the repair record has been entered in a computer database. The experts' determination of whether a particular record belongs in the first group or second group is implemented on a computer system that presents the expert with a repair record and permits the expert to select, via an input device, like a keyboard or mouse, the group in which the repair record belongs.

With respect to each repair record in both the first and second groups, the method extracts the n-grams from each record at step 30. An n-gram is fragment of N consecutive letters, punctuation marks and spaces of a text phrase. For example, the 3-grams for the word "diagnosis" are "dia", "iag", "agn", "gno", "nos" and "ose". The extraction of the n-grams for a record is also preferably accomplished by an appropriately programmed computer system.

Subsequently, the significance of each n-gram is determined at step 40. This involves counting the number of times each of the n-grams occurs in the first group and the second group. For instance, words like "repair" and "replace" are more likely to appear in the first group, i.e., the group that is considered diagnostically relevant. Consequently, the number of occurrences in the first group of the n-grams associated with these words is likely to be substantially greater than the number of occurrences in the second group for the same n-grams. This difference in count reflects the diagnostic relevance of the words like "replace" and "repair". Similarly, words like "void" and "duplicate" are more apt to appear in the second group, i.e., the diagnostically irrelevant group. As such, the number of occurrences in the first group of the n-grams associated with these words is apt to be significantly less than the number of occurrences in second group of the same n-grams, reflecting the diagnostic irrelevance of these words. Finally, words like "the" and "for" and their n-grams tend to occur equally in both the first and second groups. Again, the counting is preferably accomplished by a suitably programmed computer system.

The counts are used to determine a weight or significance of each n-gram. The weight of a particular n-gram is calculated by taking the difference between the counts for the n-gram and then dividing the difference by the total number of occurrences of the n-gram in the first and second groups. Other weighting schemes are also feasible. Diagnostically relevant n-grams have a weight that tends toward +1; diagnostically irrelevant n-grams have a weight that tends towards −1; and n-grams that are of little or no significance in determining whether a repair record is diagnostically relevant or irrelevant have a weight around 0. N-grams that are skewed toward +1 or −1 are extracted due to their relevance in determining whether or not a repair record is of diagnostic value at step 50.

Also part of the illustrated method of learning the basis for an experts decision to classify a repair record as diagnostically relevant or irrelevant is the step 20 of propagating the experts decision with respect to one repair record to similar records to shorten the learning period. In this step 20, n-gram similarity is used in making the decision of whether or not a repair record that has not yet been considered by the expert should be placed in the first or second group. Consequently, this step 20 involves initially having the n-grams for a previously considered repair record that has either been determined to be diagnostically relevant or irrelevant, which is hereinafter referred to as the parent repair record, and the n-grams for a candidate repair record. One measure of the similarity between the parent repair record and the candidate repair record is the following similarity index:

$$\text{similarity index} = [\#P_i \cap \#C_i]^2 / [\#P_i X \#C_i] \quad (1)$$

where $\#P_i$ is the number of unique n-grams in the parent repair record and $\#C_i$ is the number of unique n-grams in the candidate repair record. Other similarity measures are also feasible. If the similarity index exceeds a predetermined threshold, the candidate repair record is added to the first group. Otherwise, the candidate repair record is added to the second group.

Typically, the learned reasoning improves as the expert sorts through more and more records, either individually or with the aid of the noted similarity indexing. Eventually, however, the learned reasoning reaches a point at which it can be applied to candidate repair records to automatically determine whether the record is diagnostically relevant or irrelevant. The automatic determination of whether a candidate repair record is diagnostically relevant or irrelevant involves fragmenting the candidate repair record into n-grams and summing the weights contained in the previously established database for each of these n-grams. If the sum is very positive, then the candidate repair record is likely to be diagnostically relevant and should be added to the database. Conversely, a candidate repair record with a sum that is very negative is considered to be diagnostically irrelevant and therefore not a suitable addition to the database. Typically, when the sum is neither strongly positive nor strongly negative, the repair record is considered to be diagnostically irrelevant. The decision as to whether a sum is strongly positive, strongly negative or in between is determined by appropriate thresholds. It is also feasible to use other automatic determination methods, such as a case based approach in which the a weighted n-gram match index is determined as follows:

$$\text{Wt'd-gram match index} = [\Sigma W_{Ni}]^2 / [\Sigma W_{Pi} X \Sigma W_{Ci}] \quad (2)$$

where Ni∈(Pi∩Ci), $P_i$ is the unique n-grams in the parent repair record, $C_i$ is the unique n-grams in the candidate repair record, $W_{Pi}$ is the learned weight of $P_i \epsilon^* 0,1)$, and $W_{Ci}$ is the learned weigh of $C_i \epsilon (0,1)$.

Figure 2:
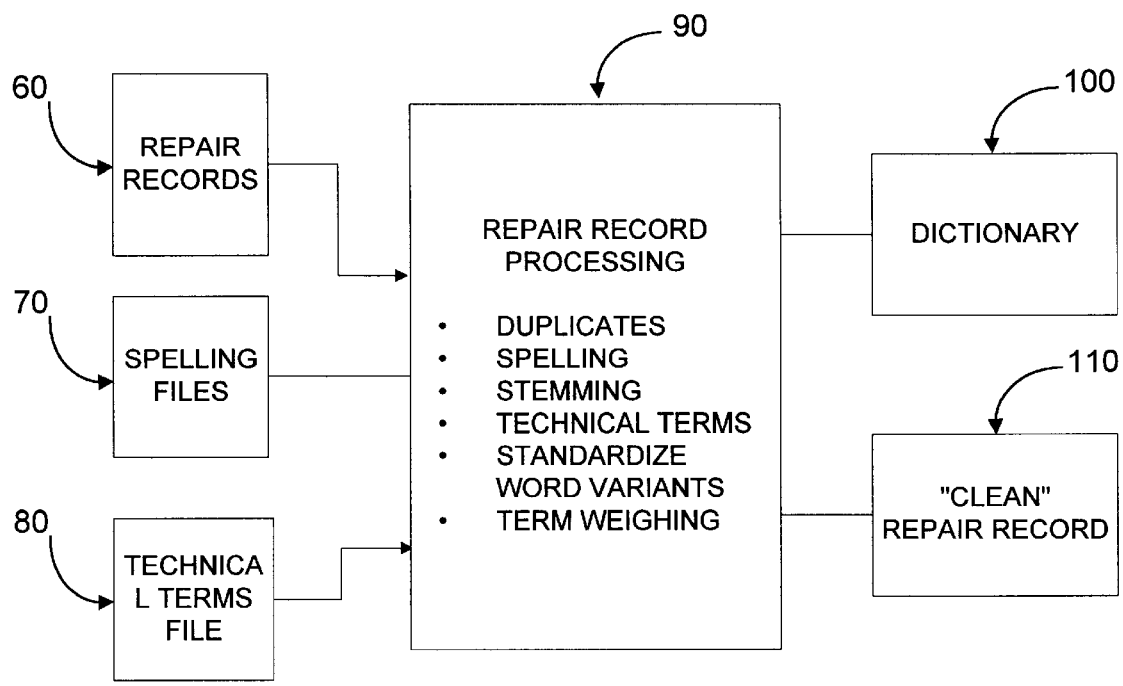
FIG. 2 is a block diagram of a method for creating a dictionary of the terms in a diagnostically relevant database of records and for processing the records to correct variation deficiencies therewith.

With reference to FIG. 2, to facilitate the use of a database of diagnostically relevant repair records, the repair records 60 that are considered to be diagnostically relevant are processed 90 to address spelling errors, duplicates, stemming, technical terms, standardize word variants and delete words with weights of approximately zero using spelling files 70 and technical terms file 80. This processing essentially standardizes the wording of each of the repair records 60 that is part of the diagnostically relevant group of records and therefore provide a clean repair record 110. This process also permits a dictionary 100 of "key" words to be built that includes the word or words within the repair record that are composed of one or more strongly positive n-grams, such as the word "repair". The dictionary 100 can be subsequently used by a field engineer to search for a term that describes the problem being encountered and is present in at least one repair record in the database. A combination of search terms may, however, not identify a relevant record. If this is the case, the field engineer can try another search term or combination of terms from the dictionary 100.

The foregoing description of the invention has been presented for purposes of illustration and description. Further, the description is not intended to limit the invention to the form disclosed herein. Consequently, variations and modifications commensurate with the above teachings, and the skill or knowledge in the relevant art are within the scope of the present invention. The preferred embodiment described herein above is further intended to explain the best mode known of practicing the invention and to enable others skilled in the art to utilize the invention in various embodiments and with the various modifications required by their particular applications or uses of the invention. It is intended that the appended claims be construed to include alternate embodiments to the extent permitted by the prior art.

What is claimed is:

1. A method for learning a process for determining if a problem/solution phrase from a record should be included in a diagnostic database, the method comprising the steps of:

retrieving a plurality of records each having phrases that describes a problem and a solution to the problem and that have been sorted by an expert into a first group of diagnostically relevant records and a second group of diagnostically irrelevant records;

accessing the first group of diagnostically relevant records and the second group of diagnostically irrelevant records;

analyzing the first and second groups to learn the reasoning used by the expert to sort said plurality of records into the first and second groups; and retaining the reasoning for use in determining whether other records should be included in the diagnostic database.

2. A method, as claimed in claim 1, wherein:

said step of analyzing includes determining a plurality of n-grams for each record in the first and second groups, wherein an n-gram is a string of consecutive characters of n characters in length.

3. A method, as claimed in claim 2, wherein:

said step of analyzing includes using said plurality of n-grams and the presence of each of said plurality of n-grams in the first group and the second group to determine a weight for each of said plurality of n-grams.

4. A method, as claimed in claim 3, wherein:

said step of analyzing includes identifying a subset of said plurality of n-grams that are diagnostically significant based on determined weight.

5. A method, as claimed in claim 4, wherein:

said step of analyzing includes using said subset to reconstruct diagnostically significant terms.

6. A method, as claimed in claim 5, wherein:

said step of analyzing includes using said diagnostically significant terms to build a data dictionary formed from said plurality of records.

7. A method, as claimed in claim 1, further comprising:

processing the plurality of records to create a data dictionary.

8. A method, as claimed in claim 7, wherein:

said step of processing includes eliminating duplicate words, correcting spelling errors in common words, correcting spelling error in technical terms, reducing extended words to root words, and standardizing word variants.

9. A method, as claimed in claim 8, wherein:

said step of processing includes filtering the words using a significance value.

10. A method, as claimed in claim 1, further comprising:

using said retained reasoning to determine if a record should be added to the diagnostic database.

11. A method, as claimed in claim 1, wherein:

said step of analyzing includes applying the reasoning learned to unsorted records.

12. A method for learning a process for determining if a problem/solution phrase from a record should be included in a diagnostic database and applying the learned process to additional records, the method comprising:

retrieving a plurality of records each having phrases that describes a problem and a solution to the problem and that have been sorted by an expert into a first group of diagnostically relevant records and a second group of diagnostically irrelevant records;

accessing the first group of diagnostically relevant records and the second group of diagnostically relevant records;

analyzing the first and second groups to learn the reasoning used by the expert to sort said plurality of records into the first and second groups;

retaining the reasoning for use in determining whether other records should be included in the diagnostic database; and applying the retained reasoning to determine whether a record that is not part of the plurality of records should be included in the diagnostic database.

13. A method for learning a process for determining if a problem/solution phrase from a record should be included in a diagnostic database, the method comprising:

providing a plurality of records each having phrases that describes a problem and a solution to the problem;

having an expert sort said plurality of records into a first group of diagnostically relevant records and the second group of diagnostically relevant records;

analyzing, as said expert is sorting, the first and second groups to learn the reasoning used by the expert to sort said plurality of records into the first and second groups;

applying reasoning learned while said expert is sorting records that have not been sorted by the expert and are similar to records that have been sorted by the expert into the first and second groups; and retaining the reasoning for use in determining whether other records should be included in the diagnostic database.

14. A method for determining diagnostic significance of problem/solution phrases within a record, comprising the steps of:

retrieving a plurality of records each having phrases that describes a problem and a solution to the problem and that have been sorted by an expert into a first group of diagnostically relevant records and a second group of diagnostically irrelevant records;

extracting n-grams from each record in the first group of diagnostically relevant records and second group of diagnostically irrelevant records;

determining the significance of each extracted n-gram; and retaining the determined significance for each extracted n-gram in a diagnostic database.

15. A method according to claim 14, wherein said step of determining significance of each extracted n-gram comprises:

counting occurrences of each n-gram in the first group of diagnostically relevant records and second group of diagnostically irrelevant records; and applying a significance weight to each n-gram in accordance with the counted occurrences.

16. A method according to claim 14, further comprising retrieving the determined significance for each extracted n-gram from the diagnostic database and applying it to evaluate new records having phrases that describe a problem and a solution to the problem.

* * * * *